(12) United States Patent
Lim (10) Patent No.: US 10,447,759 B2
(45) Date of Patent: Oct. 15, 2019

(54) WEB PAGE ACCELERATIONS FOR WEB APPLICATION HOSTED IN NATIVE MOBILE APPLICATION

(71) Applicant: Microsoft Technology Licensing, LLC, Redmond, WA (US)

(72) Inventor: Kean Ee Lim, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 178 days.

(21) Appl. No.: 15/167,019

(22) Filed: May 27, 2016

(65) Prior Publication Data

US 2017/0346876 A1 Nov. 30, 2017

(51) Int. Cl.
| | | |
|---|---|---|
| H04L 29/08 | (2006.01) | |
| G06F 3/0481 | (2013.01) | |
| G06F 3/0484 | (2013.01) | |
| G06F 16/957 | (2019.01) | |

(52) U.S. Cl.
CPC .......... H04L 67/02 (2013.01); G06F 3/04817 (2013.01); G06F 3/04842 (2013.01); G06F 16/9574 (2019.01); H04L 67/2842 (2013.01)

(58) Field of Classification Search
CPC .......... H04L 29/08072; H04L 29/0809; H04L 29/06; G06F 17/3089; G06Q 10/10
USPC ........................................................ 709/218
See application file for complete search history.

(56) References Cited

U.S. PATENT DOCUMENTS

| | | |
|---|---|---|
| 8,656,265 B1 | 2/2014 | Paulin et al. |
| 9,106,607 B1 * | 8/2015 | Lepeska .............. G06F 16/9574 |
| 2003/0204605 A1 | 10/2003 | Hudson et al. |
| 2009/0043657 A1 | 2/2009 | Swift et al. |
| 2009/0228779 A1 | 9/2009 | Williamson et al. |
| 2010/0095067 A1 | 4/2010 | Kosaraju et al. |
| 2010/0162126 A1 | 6/2010 | Donaldson et al. |
| 2011/0029899 A1 * | 2/2011 | Fainberg .............. G06F 12/0862 715/760 |
| 2011/0258532 A1 * | 10/2011 | Ceze .................... G06F 16/9574 715/234 |
| 2012/0167122 A1 | 6/2012 | Koskimies |

(Continued)

FOREIGN PATENT DOCUMENTS

EP 3001311 A1 3/2016

OTHER PUBLICATIONS

Bidelman, Eric, "A Beginner's Guide to using the Application Cache", Retrieved from <<http://www.html5rocks.com/en/tutorials/appcache/beginner/>>, Jun. 18, 2010, 6 Pages.

(Continued)

*Primary Examiner* — Hermon Asres (57) ABSTRACT

Aspects of the present disclosure relate to systems and methods for accelerating loading, parsing, and rendering of a web page hosted by a native mobile application. In one aspect, a manifest file including at least resources for rendering the webpage hosted by the native mobile application may be stored in a local web cache. A request may be sent, via the native mobile application, to a website associated with the native mobile application for the webpage. While initial content of the webpage is loading, the resources stored in the local web cache may be loaded into a browser document object model (DOM). The webpage may be rendered within the native mobile application in a user interface.

20 Claims, 6 Drawing Sheets

(56) References Cited

U.S. PATENT DOCUMENTS

| | | | |
|---|---|---|---|
| 2012/0311020 A1* | 12/2012 | Brown | G06F 12/0862 |
| | | | 709/203 |
| 2012/0317295 A1* | 12/2012 | Baird | H04L 67/02 |
| | | | 709/228 |
| 2014/0156734 A1 | 6/2014 | Stankoulov | |
| 2014/0229439 A1* | 8/2014 | Bhullar | G06F 16/23 |
| | | | 707/626 |
| 2015/0089352 A1* | 3/2015 | Conboy | G06F 16/9574 |
| | | | 715/234 |

OTHER PUBLICATIONS

"International Search Report and Written opinion Issued in PCT Application No. PCT/US2017/033431", dated Jul. 3, 2017, 12 Pages.

"HTML: Offline Web applications", Published on: Nov. 13, 2014 Available at: https://html.spec.whatwg.org/multipage/browsers.html#offline.

"Client side storage for mobile web apps", Published on: Oct. 19, 2011 Available at: http://blog.ubilabs.net/post/11651238012/client-side-storage-for-mobile-web-apps.

Nicolaou, Alex, "Best Practices on the Move: Building Web Apps for Mobile Devices", In Journal of Mobile Web Development, vol. 11, Issue 6, Jun. 2013, pp. 1-15.

Huang, et al., "Poster: A framework for instant mobile web browsing with smart prefetching and caching", In Proceedings of 20th annual international conference on Mobile computing and networking, Sep. 7, 2014, pp. 367-369.

* cited by examiner

FIG. 1

PRIOR ART

WEB PAGE ACCELERATIONS FOR WEB APPLICATION HOSTED IN NATIVE MOBILE APPLICATION

BACKGROUND

Both native mobile applications and websites may provide content for the benefit of a user of the native mobile applications and/or websites. Entities that develop applications may develop both a native application and a website application. For example, a user may download the native application to a client device and access the application content via the native application. In another example, a user may access the application content via a website. Generally, native applications access application content using Application Programming Interface (API) technology while website applications access application content using website technology (e.g., browsers, html, parsing, rendering). In some cases, native applications may host webpages that come from remote web servers. However, in these cases, download time, parse time, and rendering speed of the hosted webpages may be slow and inefficient. In turn, a user's experience of viewing and/or interacting with webpages hosted by native mobile applications may be dissatisfying.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In summary, the disclosure generally relates to systems and methods for accelerating loading, parsing, and rendering of a web page hosted by a native mobile application. In one aspect, a manifest file including at least resources for rendering the webpage hosted by the native mobile application may be stored in a local web cache. A request may be sent, via the native mobile application, to a website associated with the native mobile application for the webpage. While initial content of the webpage is loading, the resources stored in the local web cache may be loaded into a browser document object model (DOM). The webpage may be rendered within the native mobile application in a user interface.

In another aspect, a method for pre-loading webpage data by a native mobile application is presented. A request may be sent from the native mobile application to a service for a latest version of a manifest file. The manifest file may include at least resources for rendering a webpage hosted by the native mobile application. When the service has the latest version of the manifest file, the latest version of the manifest file may be downloaded from the service. The latest version of the manifest file may be stored in a local web cache.

In further aspects, in response to receiving a selection of a native mobile application icon, a native mobile application associated with the native mobile application icon may be launched. A request may be sent to a service for a manifest file. The manifest file may include at least resources for rendering a web page hosted by the native mobile application. The manifest file may be downloaded from the service and stored in a local web cache.

DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Aspects of the disclosure are generally directed to accelerating loading, parsing, and rendering of a webpage hosted by a native mobile application. For example, a first phase for accelerating loading, parsing, and rendering of a webpage hosted by a native mobile application may include pre-loading webpage data using the native mobile application. For example, the webpage data may be pre-loaded by downloading and storing resources associated with a webpage/website that are required for rendering the webpage in the native mobile application. The resources may be stored in a local web cache. In one example, the resources may be included in a manifest file that is retrieved from a service (e.g., in the cloud). For example, the native mobile application may send a request to the service for a latest version of the manifest file. In one example, when the native mobile application already has the latest version of the manifest file including the manifest file contents (e.g., resources), retrieving the manifest file isn't necessary. When the service has a later version of the manifest file than the version of the manifest file currently stored at the local web cache, the native mobile application may download and store the latest version of the manifest file. In one example, the resources included in the manifest file include Javascript and Cascading Style Sheet (CSS) frameworks needed for rendering the webpage. In this regard, when a request is made through the native mobile application for a webpage hosted by the native mobile application, the resources that are already stored in the local web cache for that webpage do not have to be downloaded from the service/website. In turn, the webpage is rendered within the native mobile application in the user interface quickly, efficiently, and in less time than a webpage using current webpage technology takes to be rendered in the user interface. As such, a technical effect that may be appreciated is that by storing the resources needed for rendering a webpage in the local web cache network round-trip costs may be reduced.

As discussed above, native applications access application content using Application Programming Interface (API) technology while website applications access application content using website technology (e.g., browsers, html, parsing, rendering). In some cases, native applications may host webpages that come from remote web servers. In this case, the native application retrieves application data using the API technology (in some cases the application data may be pre-loaded) and webpage data using the website technology. However, in these cases, download time, parse time, and rendering speed of the hosted webpages may be slow and inefficient. In turn, a user's experience of viewing and/or interacting with webpages hosted by native mobile applications may be dissatisfying. Accordingly, aspects described herein include accelerating loading, parsing, and rendering of a webpage hosted by a native mobile application. As discussed above, a first phase for accelerating loading, parsing, and rendering of a webpage hosted by a native mobile application may include pre-loading webpage data using the native mobile application. In this regard, the native mobile application of the present disclosure is pre-loading webpage/website data that may be accessed and/or used at a later time (e.g., not native mobile application data that is used in the application itself). In contrast, native mobile applications described in the prior art herein may pre-load data that is being used in the native mobile application itself (i.e., mobile application data).

In aspects, a second phase for accelerating loading, parsing, and rendering of a webpage hosted by a native mobile application may include loading the resources stored in the local web cache into a browser Document Object Model (DOM) while an initial payload of a webpage is loading. For example, at some point in time after the resources have been retrieved and stored in the local web cache, a user of the native mobile application may access a webpage hosted by the native mobile application. In one example, a user may select an icon associated with a website and/or webpage hosted by the native mobile application. In one example, the icon may include a link (e.g., a URL) to the website and/or webpage. In response to receiving the selection of the icon associated with the website and/or webpage hosted by the native mobile application, the native mobile application may send a request to the corresponding website for the webpage. While the initial payload of the webpage (e.g., the root Hyper Text Markup Language (HTML) page) is loading, the resources stored in the local web cache may be loaded into the browser DOM. When the initial payload of the webpage is returned, additional resources may need to be obtained to render the webpage. The additional resources include only those resources that were not pre-loaded/stored in the local web cache. For example, instead of requiring all the resources needed for the webpage be downloaded (which is typical for current webpage technology), only a small portion of the resources needed for the webpage may need to be obtained. In this regard, the resources may be downloaded for the webpage in less time than it takes to download resources using current webpage technology. In one example, storing the resources in the local web cache, as discussed above herein in the first phase, may save approximately three seconds of download time.

Furthermore, loading the resources stored in the local web cache into the browser DOM while the initial payload of the webpage is loading may facilitate rendering the webpage in less time than it takes for current webpage technology. For example, in current webpage technology, while the initial payload of the webpage is loading, the client is idle and all the resources needed for rendering the webpage are requested and downloaded before they are loaded into the browser DOM. In the technology of the present disclosure, as described herein, many of the resources are loaded into the browser DOM while the initial payload of the webpage is loading before the initial payload is returned and any additional resources are requested. In one example, loading the resources stored in the local web cache into the browser DOM while the initial payload of the webpage is loading may save approximately two seconds of loading resources into the browser DOM. As such, a total of approximately five seconds may be saved for loading, parsing, and rendering of a webpage hosted by a native mobile application using the technology of the present disclosure. In one example, approximately 30% of time is saved from when a user selects an icon associated with a website within the native mobile application to when a webpage and/or website is rendered within the native mobile application. In this regard, another technical effect that may be appreciated is that rendering of webpages hosted by native mobile applications fast and efficiently facilitates a compelling visual and functional experience to allow users to efficiently view and interact with a user interface to quickly, easily, and efficiently view webpages hosted by a native mobile application. Another technical effect that may be appreciated is that by reducing downloads when a user visits a website by pre-loading website/webpage resources/data, processor load may be reduced, memory may be conserved, and network bandwidth usage may be reduced.

Figure 1:
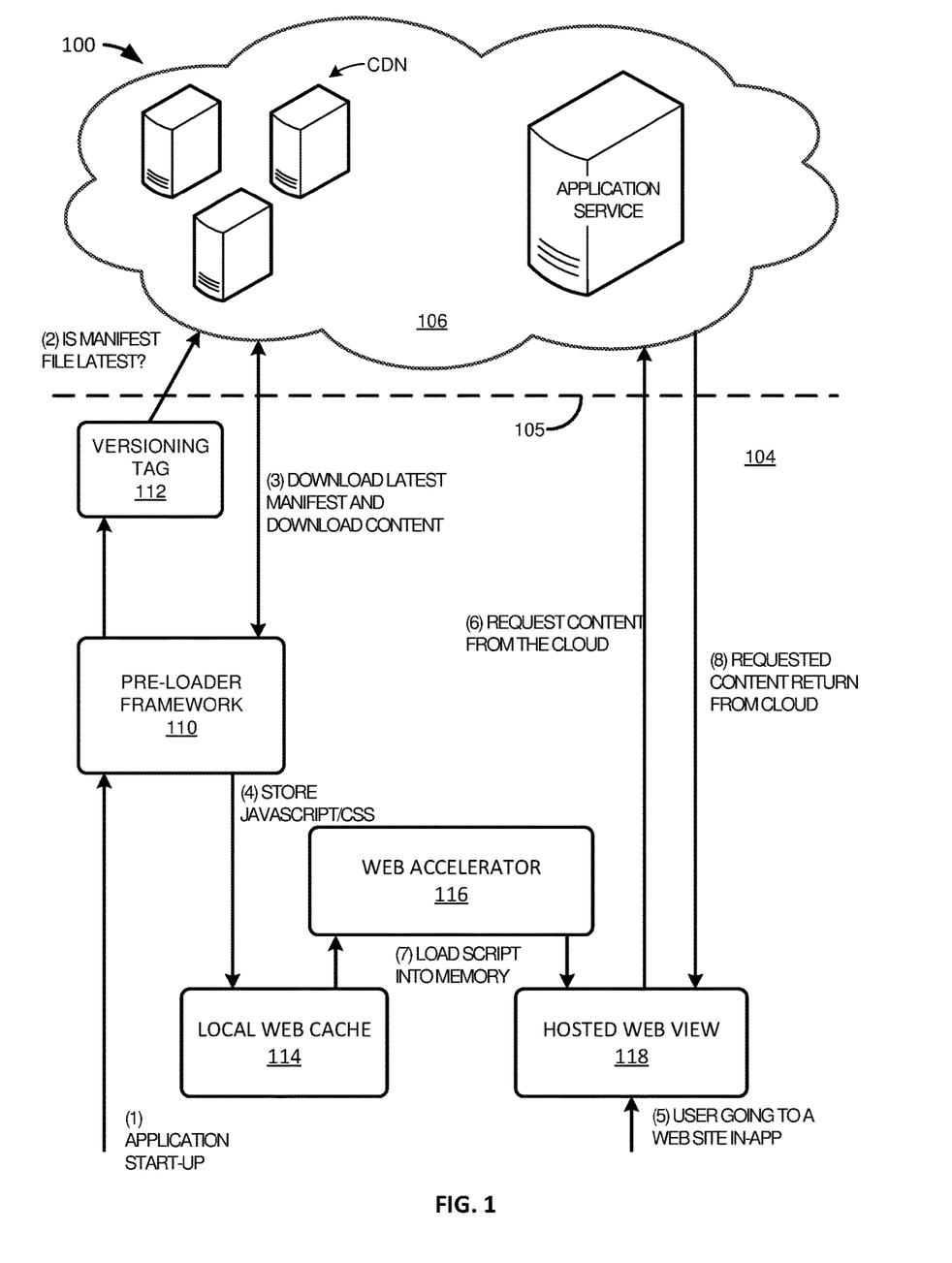
FIG. 1 illustrates an exemplary enhanced native mobile application system for accelerating loading, parsing, and rendering of a web page hosted by a native mobile application, according to an example aspect.

Referring now to the drawings, in which like numerals represent like elements through the several figures, aspects of the present disclosure and the exemplary operating environment will be described. With reference to FIG. 1, one aspect of a native mobile application system 100 for accelerating loading, parsing, and rendering of a webpage hosted by a native mobile application is illustrated. In aspects, the native mobile application system 100 may be implemented on a client computing device 104. In a basic configuration, the client computing device 104 is a handheld computer having both input elements and output elements. The client computing device 104 may be any suitable computing device for implementing the native mobile application system 100 for accelerating loading, parsing, and rendering of a webpage hosted by a native mobile application. For example, the client computing device 104 may be at least one of: a mobile telephone; a smart phone; a tablet; a phablet; a smart watch; a wearable computer; a personal computer; a desktop computer; a laptop computer; a gaming device/computer (e.g., Xbox); a television; and etc. This list is exemplary only and should not be considered as limiting. Any suitable client computing device 104 for native mobile application system 100 for accelerating loading, parsing, and rendering of a webpage hosted by a native mobile application may be utilized.

In aspects, the native mobile application system 100 may be implemented on a service 106. The service 106 may provide data to and from the client computing device 104 through a network 105. In aspects, the native mobile application system 100 may be implemented on more than one service 106, such as a plurality of services 106. In one example, the service 106 includes a cloud service. In another example, the service 106 includes a content delivery network (CDN) and/or an application service. In some examples, the service 106 includes a plurality of CDNs and/or a plurality of application services. In one case, the application service may include a service such as SharePoint. As discussed above, the service 106 may provide data to and from the client computing device 104 through the network 105. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums. In some aspects, the native mobile application system 100 may be implemented on both a client computing device 104 and a service 106.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an Intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As illustrated in FIG. 1, the client computing device 104 may include a pre-loader framework 110, a versioning tag 112, a local web cache 114, a web accelerator 116, and a hosted web view 118. The various components may be implemented using hardware, software, or a combination of hardware and software. In examples, the pre-loader framework 110 may be part of a native mobile application located at the client computing device 104. The native mobile application may include any application that can be downloaded from an application store to the client computing device 104. In one example, the native mobile application is a SharePoint mobile application. The native mobile application may be downloaded to any platform running on the client computing device 104 (e.g., any operating system). The pre-loader framework 110 may be configured to send a request for a manifest file from the native mobile application to the service 106. For example, when the native mobile application is launched (step (1)), the native mobile application may start the pre-loader framework 110. When the pre-loader framework 110 is started, the pre-loader framework may send a request to the service 106 for a manifest file. In one example, the request may be sent to a CDN network. The manifest file may include resources for rendering a webpage hosted by the native mobile application. In one example, the resources may include at least Javascript and Cascading Style Sheet (CSS) frameworks associated with the native mobile application.

In aspects, the versioning tag 112 may tag the manifest file with a version number. For example, the request for the manifest file sent to the service 106 may indicate which version of the manifest file is currently stored in the local web cache 114. In this regard, when the request for the manifest file is sent to the service 106, the service may determine whether it has a later version of the manifest file (step (2)). When the service does not have a later version of the manifest file, a download of the manifest file (e.g., the framework resources) is not needed. In this regard, the manifest file is only downloaded when needed (e.g., when a later/newer version exists in the service 106). When the service has a later version of the manifest file, the pre-loader framework 110 may download the manifest file and its contents (e.g., resources) (step (3)). In one example, up to 30 files and/or 1.5 MB of data may be downloaded.

When the manifest file is downloaded by the pre-loader framework 110, the pre-loader framework 110 may store the manifest file in the local web cache 114 (step (4)). The local web cache may include any local web cache suitable for caching and/or storing a manifest file and/or the resources included in the manifest file. In aspects, the hosted web view 118 may include a browser experience for a user of the native mobile application. For example, a user may select an icon associated with a website in the native mobile application (step (5)). In response to receiving a selection of the icon associated with the website, the native mobile application may send a request to the service 106 (e.g., the website) for content (step(6)). In one example, the request is sent to an application service. In one example, the application service is associated with the native mobile application. In one case, the application service is SharePoint Online. In some examples, the content may include one or more webpages associated with the website. In some examples, the content may include initial content (e.g., a root/initial HTML page) While initial content is loading, the web accelerator 116 may retrieve the stored manifest file (e.g., resources) from the local web cache 114 and load the resources into memory (step (7)). For example, the web accelerator 116 may load the resources stored in the local web cache 114 into a browser DOM. A DOM is a cross-platform and language-independent convention for representing and interacting with objects in HTML, XHTML, and XML documents, and is well known to those skilled in the art. In another example, while initial content is loading, the resources may be pre-compiled into the browser DOM. (step (7)). When the initial content is done loading, the initial content may be sent to the native mobile application (step (8)). In some cases, additional resources may have to be obtained before the website and/or webpages may be rendered in the hosted web view 118, which will be described in more detail relative to FIG. 3.

Figure 2:
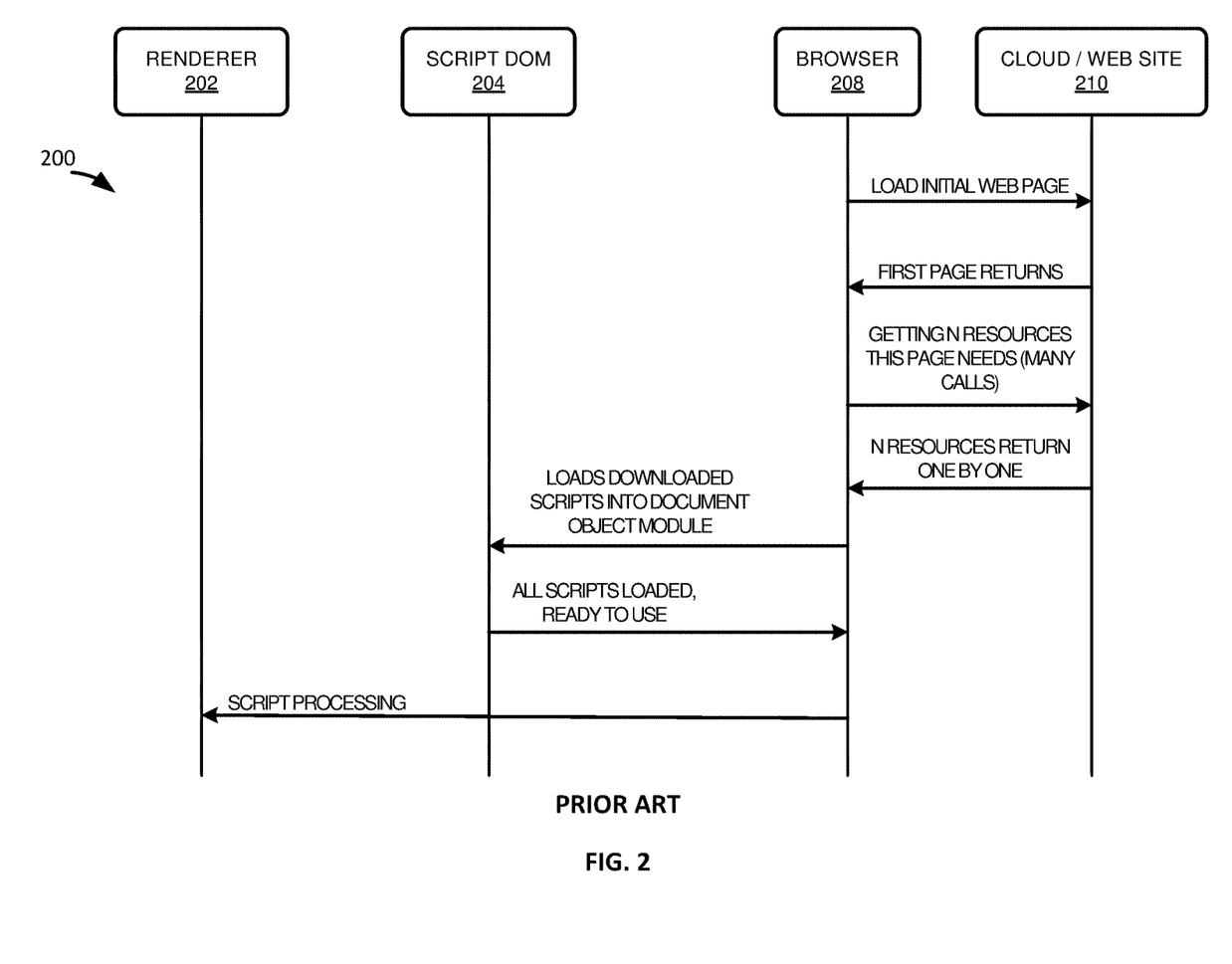
FIG. 2 illustrates a sequence diagram for loading a website, according to an example of the prior art.

FIG. 2 illustrates a sequence diagram 200 for loading a website, according to an example of the prior art. The sequence diagram 200 includes a renderer 202, a script DOM 204, a cache 206, a browser 208, and a website 210. When a user identifies a website 210 from the browser 208, a request may be sent to the website 210 to load an initial webpage. When the initial webpage is done loading, the initial webpage may be returned to the browser 208. A request may be sent from the browser 208 to the website 210 for a plurality of resources that are required for rendering the webpage. The plurality of resources are returned to the browser 208 one by one. When the initial webpage and all the resources needed to render the webpage are returned to the browser 208, the browser 208 may load the resources into the script DOM 204. When the scripts are loaded, the scripts may be processed at the rendered 202, where the webpage may be rendered on a user interface. The sequence diagram 200 for loading a webpage illustrates how sequential the process is for loading a webpage using current (e.g., prior art) webpage technology.

Figure 3:
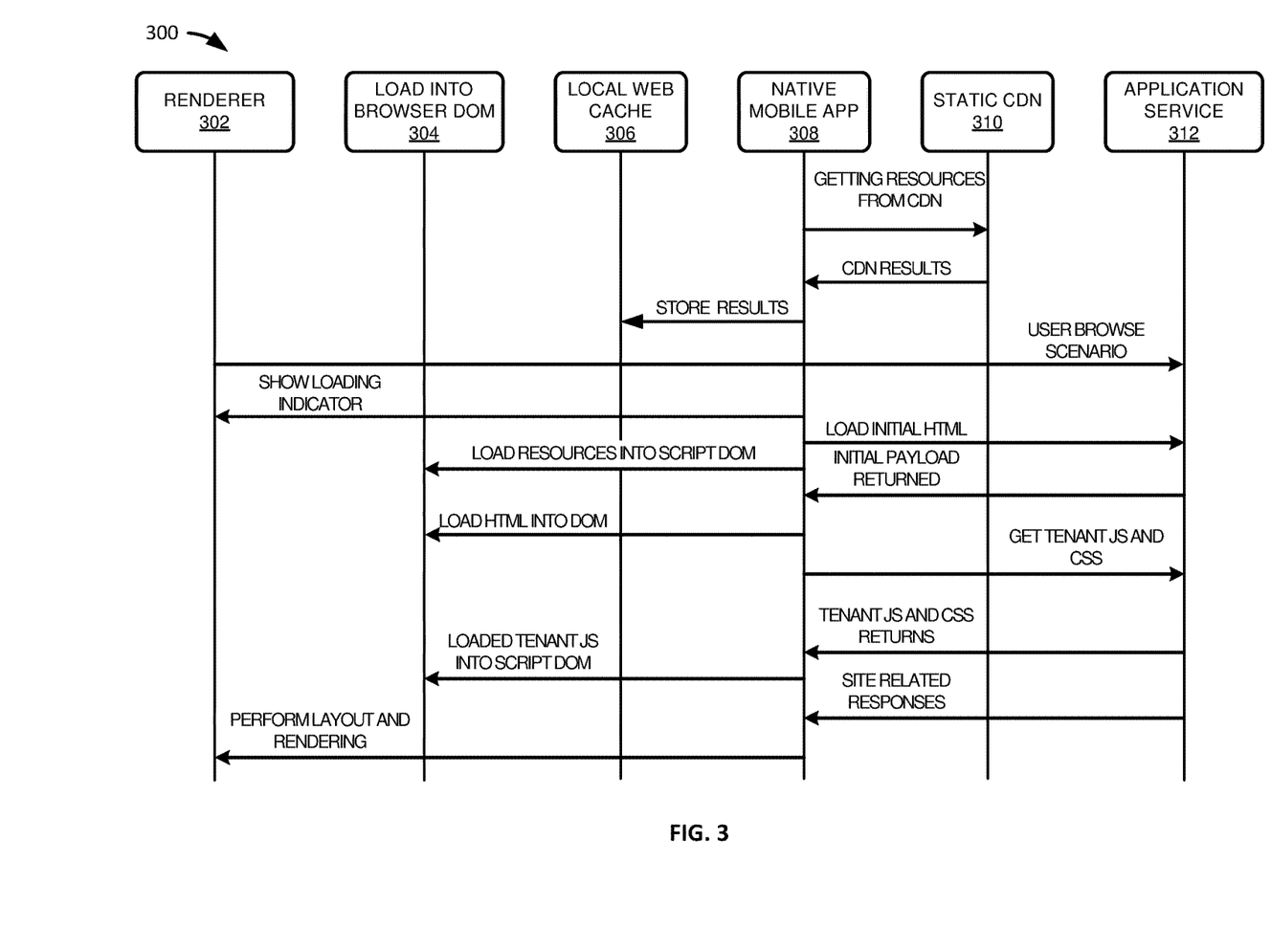
FIG. 3 illustrates a sequence diagram for accelerating loading, parsing, and rendering of a web page hosted by a native mobile application, according to an example aspect.

FIG. 3 illustrates a sequence diagram 300 for accelerating loading, parsing, and rendering of a web page hosted by a native mobile application, according to an example aspect. The sequence diagram 300 includes a renderer 302, a browser DOM 304, a local web cache 306, a native mobile application 308, a CDN 310, and an application service 312. In a first phase, upon launching the native mobile application 308, the native mobile application 308 may send a request to the CDN 310 for a manifest file. The manifest file includes resources (e.g., webpage data) for rendering a webpage hosted by the native mobile application 308. In some examples, the resources include Javascript and CSS frameworks associated with the native mobile application 308. The native mobile application 308 may download the resources from the CDN 310. When the resources are downloaded from the CDN 310, the native mobile application 308 may store the resources in the local web cache 306. As discussed above, the resources stored are associated with a webpage that may be rendered at a future time.

In a second phase, while a user of the native mobile application 308 is viewing and/or interacting with the native mobile application 308, the user may access a website and/or webpage associated with the native mobile application 308. In this regard, the user may select an icon within the native mobile application 308 associated with a website. In response to receiving a selection of the icon associated with the website, the renderer 302 may initiate a request to the application service 312 (e.g., an application service associated with the native mobile application 308) to load the website. While an initial payload of the website is loading, a loading status indicator may be presented within the native mobile application 308 by the renderer 302. In another example, while the initial payload of the website is loading, the native mobile application 308 loads the resources stored in the local web cache 306 into the browser DOM 304. In addition to loading the resources stored in the local web cache 306 into the browser DOM 304 while the initial payload of the website is loading, the resources may be pre-compiled into the browser DOM 304. When the initial payload is returned (e.g., downloaded from the application service 312 to the native mobile application 308), the initial payload may be loaded into the browser DOM 304. As discussed above, loading and pre-compiling the resources stored in the local web cache 306 into the browser DOM 304 while the initial payload of the website is loading may save approximately two seconds of load time into the browser DOM 304. In other words, the native mobile application 308 is parallel processing while loading the website. In contrast, as illustrated in FIG. 2, the current technology for loading a website is sequentially processing while loading the website (e.g., the client is idle while the initial payload is loading).

In some cases, additional resources may be required for rendering the website and/or webpage. In this regard, the native mobile application 308 may send a request to the application service 312 for additional (e.g., tenant) resources. As discussed above, the additional resources may include only the resources that were not pre-loaded/stored in the local web cache 306. In some cases, no additional resources may be required to render the website and/or webpage. In this case, the website and/or webpage may be rendered by the renderer 302 after the initial payload is downloaded at the native mobile application 308 and loaded into the browser DOM 304. In turn, the resources may be downloaded for the webpage in less time than it takes for current webpage technology. For example, maybe only 10 scripts of 30 scripts may be downloaded when 20 scripts of the 30 scripts are stored at the local web cache 306. In one example, storing the resources in the local web cache 306 may save approximately three seconds of download time. When any required additional resources are returned and downloaded at the native mobile application 308, the additional resources may be loaded into the browser DOM 304. In some examples, additional website and/or webpage related content/responses may be downloaded at the native mobile application 308. The website and/or webpage may be rendered by the renderer 302 within the native mobile application 308 in a user interface.

Figure 4:
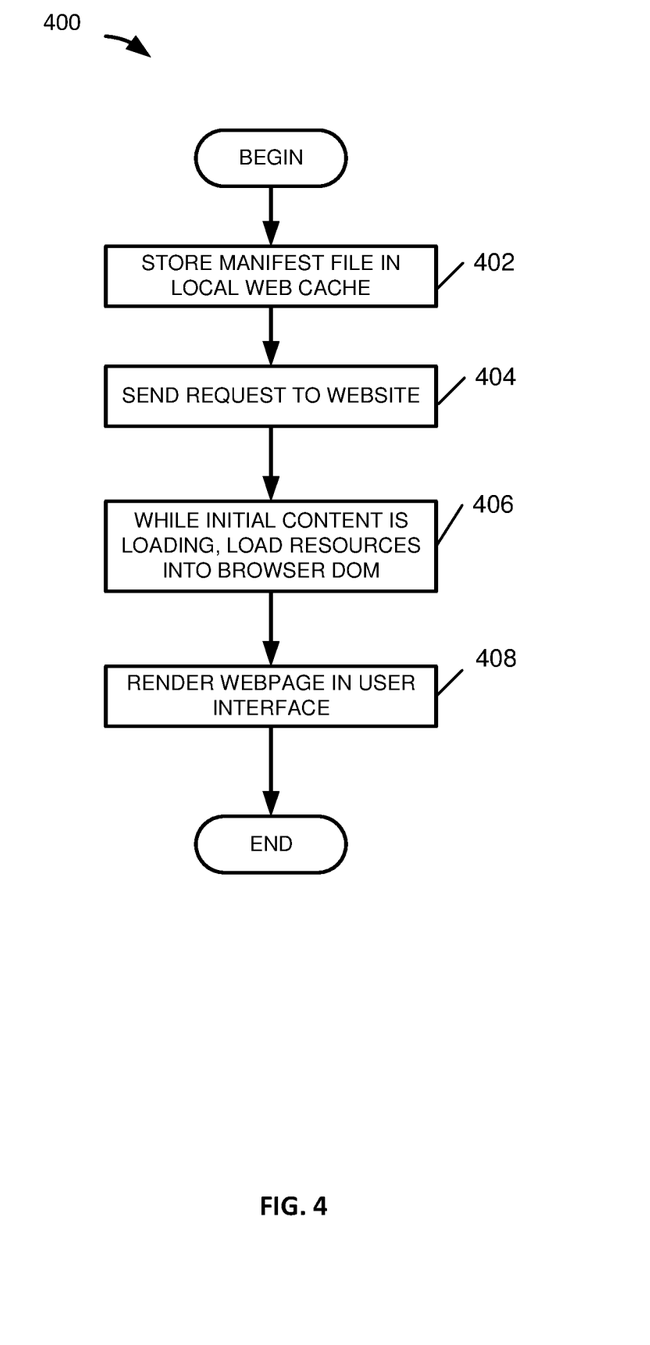
FIG. 4 illustrates an exemplary method for accelerating loading, parsing, and rendering of a web page hosted by a native mobile application, according to an example aspect.

Referring now to FIG. 4, an exemplary method 400 for accelerating loading, parsing, and rendering of a web page hosted by a native mobile application, according to an example aspect is shown. Method 400 may be implemented on a computing device or a similar electronic device capable of executing instructions through at least one processor. Method 400 may begin at operation 402, where a manifest file is stored in a local web cache. In one example, the manifest file includes resources for rendering a webpage hosted by a native mobile application. In one example, the resources may include at least Javascript and Cascading Style Sheet (CSS) frameworks associated with the native mobile application. The native mobile application accesses and stores the resources in the local web cache before the webpage is accessed, hosted, and launched. In this regard, the native mobile application is storing resources associated with a specific website associated with the native mobile application. In some cases, the website may never be accessed (e.g., a user may never go to the website) even when the resources are stored in the local web cache.

After the manifest file (e.g., webpage resources) are stored in the local cache (e.g., upon launching the native mobile application), flow proceeds to operation 404 where a request is sent, via the native mobile application, to a website associated with the native mobile application for the webpage. In some examples, the request is sent to the website in response to receiving a selection of an icon within the native mobile application, where the icon is associated with the website. When the request is sent to the website, an initial payload of the website may be loaded. In one example, the initial payload may include initial content and/or initial/root HTML.

While the initial content/payload of the website is loading, flow proceeds to operation 406, where the resources stored in the local web cache are loaded into a browser DOM. In one example, when the resources stored in the local web cache are loaded into the browser DOM, the resources may be pre-compiled into the browser DOM. In another example, a loading status indicator may be presented within the native mobile application while the initial content/payload of the website is loading. In one example, loading and pre-compiling the resources stored in the local web cache into the browser DOM while the initial content/payload of the website is loading may save approximately two seconds of load time into the browser DOM. In another example, the amount of load time saved may be based on the website (e.g., web application) and/or webpage hosted by the native mobile application. In some cases, more than two seconds of download time may be saved. In other cases, less than two seconds of download time may be saved.

When the initial content/payload of the website is done loading and downloaded to the native mobile application, flow proceeds to operation 408 where the website and/or webpage is rendered within the native mobile application in a user interface. In one example, the website and/or webpage is rendered in a user interface of a client computing device, as discussed herein. In some cases, additional resources may be downloaded after the initial content/payload of the website is downloaded and before the website and/or webpage is rendered. In this case, as discussed above, the additional resources may include only the resources that were not pre-loaded/stored in the local web cache. In turn, in one example, storing the resources in the local web cache may save approximately three seconds of download time. In other examples, the amount of download time saved may be based on the website, web application, and/or webpage hosted by the native mobile application and/or the number of resources that need to be/are downloaded. In one case, storing the resources in the local web cache may save more than three seconds of download time. In another case, storing the resources in the local web cache may save less than three seconds of download time.

Figure 5:
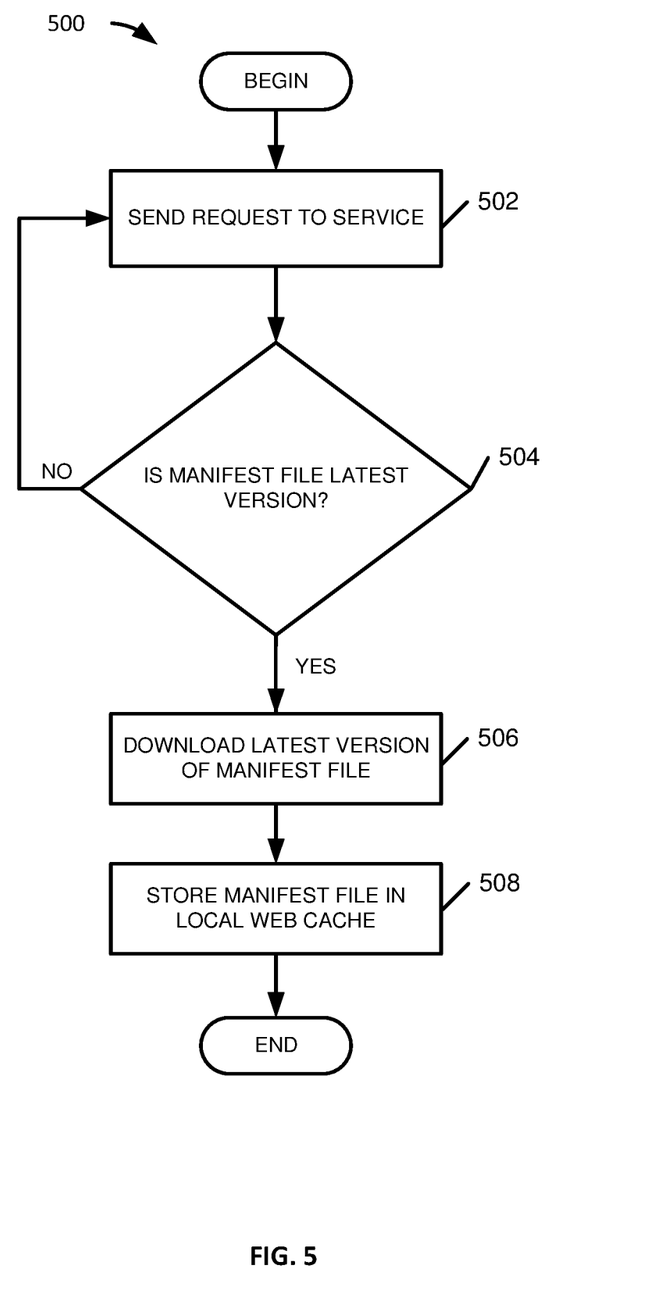
FIG. 5 illustrates an exemplary method for pre-loading webpage data by a native mobile application, according to an example aspect.

Referring now to FIG. 5, an exemplary method 500 for pre-loading webpage data by a native mobile application, according to an example aspect is shown. Method 500 may be implemented on a computing device or a similar electronic device capable of executing instructions through at least one processor. Method 500 begins at operation 502 where a request is sent from a native mobile application to a service for a latest version of a manifest file. In one example, the manifest file includes resources for rendering a webpage and/or website hosted by the native mobile application. In one example, the resources for rendering the webpage and/or website may include at least Javascript and Cascading Style Sheet (CSS) frameworks associated with the native mobile application. The service may include at least a content delivery network and a native mobile application service. In one example, the request is sent to the content delivery network.

When the request is sent from the native mobile application to the service for a latest version of a manifest file, flow proceeds to decision operation 504 where it is determined whether the manifest file is a latest version. For example, the manifest file may be tagged with a version number. In this regard, the request for the manifest file sent to the service may indicate which version of the manifest file is currently stored in the local web cache. In this regard, when the request for the manifest file is sent to the service, the service may determine whether it has a later and/or latest version of the manifest file. When the service determines it does not have a later version of the manifest file, a download of the latest manifest file is not needed and flow proceeds back to operation 502 where a request is sent from a native mobile application to a service for a latest version of a manifest file (e.g., upon the next opening/launching of the native mobile application).

When the service determines it has a later and/or latest version of the manifest file, flow proceeds to operation 506 where the latest version of the manifest file is downloaded from the service. In one example, up to 30 files/scripts and/or 1.5 MB of data may be downloaded from the service. In other examples, more than 30 files/scripts and/or 1.5 MB of data may be downloaded. In another example, less than 30 files/scripts and/or 1.5 MB of data may be downloaded. In one example, approximately 20 files/scripts may be downloaded. In one example, downloading the manifest file from the service takes approximately 3 seconds.

When the latest version of the manifest file is downloaded from the service, flow proceeds to operation 508 where the latest version of the manifest file is stored in a local web cache. The native mobile application may store the latest version of the manifest file in the local web cache before the webpage hosted by the native mobile application is accessed, hosted, and launched. In this regard, the native mobile application is storing resources associated with a specific website and/or web application associated with the native mobile application. In some cases, the website may never be accessed (e.g., a user may never go to the website) even when the resources are stored in the local web cache. In other cases, when a user accesses the website through the native mobile application, by pre-loading/storing the latest version of the manifest file in the local web cache, the website and/or webpage may be rendered quickly and efficiently, ultimately resulting in a satisfying user experience.

The term rendering as used herein generally refers to the various capabilities employed in various computing architectures to assemble information that can then be used by other capabilities to generate an image or images. Within the context of methods 400 and 500, for example, rendering a webpage, for example, generally refers to assembling the information or data used to generate an image or images that together result in the rendered webpage/website. Animation or other dynamics may also be used to achieve certain effects.

However, it may be appreciated that other perspectives on rendering may be considered within the scope of the present disclosure. For example, rendering as used herein may also, in some scenarios, be considered to refer to the various capabilities employed by various computing architectures to generate an image or images from information assembled for that purpose. With respect to the methods 400 and 500, rendering a webpage may refer to generating an image or images, from information assembled for that purpose, that together result in the webpage, which can then be displayed.

It may also be appreciated that rendering in some scenarios may refer to a combination of the aforementioned possibilities. For example, rendering in some scenarios may refer to both assembling the information used to generate an image or images for a webpage and then generating the image or images of the webpage. In addition, a wide variety of other steps, processes, and stages may occur within the context of presenting views of an application, all of which may be considered part of presenting a view. Thus, yet one other variation on methods 400 and 500 includes, but is not limited to, presenting a webpage and/or website.

Figure 6:
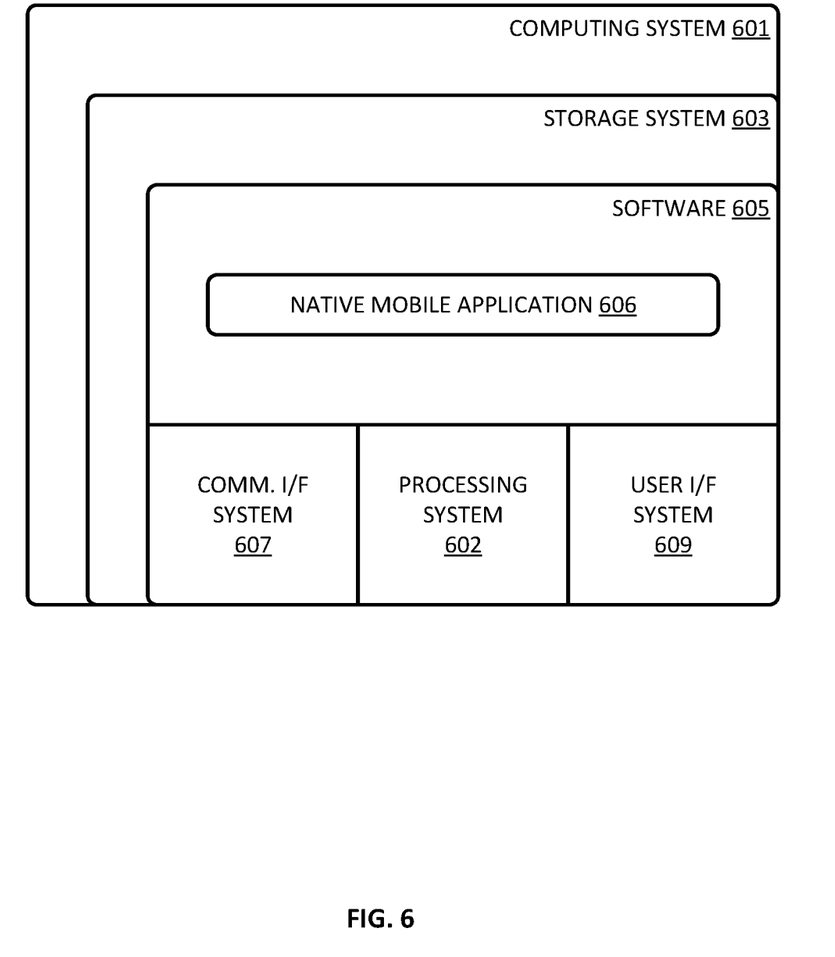
FIG. 6 illustrates a computing system suitable for implementing the enhanced native mobile application technology disclosed herein, including any of the environments, architectures, elements, processes, user interfaces, and operational scenarios and sequences illustrated in the Figures and discussed below in the Technical Disclosure.

FIG. 6 illustrates computing system 601 that is representative of any system or collection of systems in which the various applications, services, scenarios, and processes disclosed herein may be implemented. Examples of computing system 601 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 601 may be implemented as a single apparatus, system, or device or may be implemented in a distributed manner as multiple apparatuses, systems, or devices. Computing system 601 includes, but is not limited to, processing system 602, storage system 603, software 605, communication interface system 607, and user interface system 609. Processing system 602 is operatively coupled with storage system 603, communication interface system 607, and user interface system 609.

Processing system 602 loads and executes software 605 from storage system 603. Software 605 includes native mobile application 606, which is representative of the native mobile applications discussed with respect to the preceding FIGS. 1-5. When executed by processing system 602 to enhance rendering of hosted webpages, software 605 directs processing system 602 to operate as described herein for at least the various processes, operational scenarios, and sequences discussed in the foregoing implementations. Computing system 601 may optionally include additional devices, features, or functionality not discussed for purposes of brevity.

Referring still to FIG. 6, processing system 602 may comprise a micro-processor and other circuitry that retrieves and executes software 605 from storage system 603. Processing system 602 may be implemented within a single processing device, but may also be distributed across multiple processing devices or sub-systems that cooperate in executing program instructions. Examples of processing system 602 include general purpose central processing units, application specific processors, and logic devices, as well as any other type of processing device, combinations, or variations thereof.

Storage system 603 may comprise any computer readable storage media readable by processing system 602 and capable of storing software 605. Storage system 603 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 603 may also include computer readable communication media over which at least some of software 605 may be communicated internally or externally. Storage system 603 may be implemented as a single storage device, but may also be implemented across multiple storage devices or sub-systems co-located or distributed relative to each other. Storage system 603 may comprise additional elements, such as a controller, capable of communicating with processing system 602 or possibly other systems.

Software 605 may be implemented in program instructions and among other functions may, when executed by processing system 602, direct processing system 602 to operate as described with respect to the various operational scenarios, sequences, and processes illustrated herein. For example, software 605 may include program instructions for implementing enhanced rendering of hosted webpages.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 605 may include additional processes, programs, or components, such as operating system software, virtual machine software, or other application software, in addition to or that include native mobile application 606. Software 605 may also comprise firmware or some other form of machine-readable processing instructions executable by processing system 602.

In general, software 605 may, when loaded into processing system 602 and executed, transform a suitable apparatus, system, or device (of which computing system 601 is representative) overall from a general-purpose computing system into a special-purpose computing system customized to facilitate enhanced rendering of hosted webpages. Indeed, encoding software 605 on storage system 603 may transform the physical structure of storage system 603. The specific transformation of the physical structure may depend on various factors in different implementations of this description. Examples of such factors may include, but are not limited to, the technology used to implement the storage media of storage system 603 and whether the computer-storage media are characterized as primary or secondary storage, as well as other factors.

For example, if the computer readable storage media are implemented as semiconductor-based memory, software 605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 607 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 609 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 609. In some cases, the input and output devices may be combined in a single device, such as a display capable of displaying images and receiving touch gestures. The aforementioned user input and output devices are well known in the art and need not be discussed at length here.

User interface system 609 may also include associated user interface software executable by processing system 602 in support of the various user input and output devices discussed above. Separately or in conjunction with each other and other hardware and software elements, the user interface software and user interface devices may support a graphical user interface, a natural user interface, or any other type of user interface.

Communication between computing system 601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Among other examples, the present disclosure presents systems comprising: at least one processor; and memory encoding computer executable instructions that, when executed by the at least one processor, perform a method for accelerating loading, parsing, and rendering of a web page hosted by a native mobile application, the method comprising: storing a manifest file including at least resources for rendering the webpage hosted by the native mobile application in a local web cache; sending a request, via the native mobile application, to a website associated with the native mobile application for the webpage; while initial content of the webpage is loading, loading the resources stored in the local web cache into a browser document object model (DOM); and rendering the webpage within the native mobile application in a user interface. In further examples, the method further comprises sending a request to the website for additional resources for rendering the webpage, wherein the additional resources include resources not included in the manifest file. In further examples, the method further comprises downloading the additional resources. In further examples, the method further comprises loading the additional resources into the browser DOM. In further examples, the resources for rendering the web page hosted by the native mobile application include at least Javascript and Cascading Style Sheets (CSS) frameworks associated with the native mobile application. In further examples, the method further comprises while the initial content of the webpage is loading, pre-compiling the resources for rendering the webpage in response to loading the resources stored in the local web cache into the browser document object model (DOM). In further examples, the method further comprises while the initial content of the webpage is loading presenting a loading status indicator within the native mobile application.

Further aspects disclosed herein provide an exemplary computer-implemented method for pre-loading webpage data by a native mobile application, the computer-implemented method comprising: sending a request from the native mobile application to a service for a latest version of a manifest file, wherein the manifest file includes at least resources for rendering a webpage hosted by the native mobile application; when the service has the latest version of the manifest file, downloading the latest version of the manifest file from the service; and storing the latest version of the manifest file in a local web cache. In further examples, the computer-implemented method further comprises sending a request from the native mobile application to the service for a latest version of a manifest file in response to launching the native mobile application. In further examples, the resources for rendering the web page hosted by the native mobile application include at least Javascript and Cascading Style Sheets (CSS) frameworks associated with the native mobile application. In further examples, the computer-implemented method further comprises in response to receiving a selection of an icon associated with a website in the native mobile application, sending a request for the webpage to the website. In further examples, the computer-implemented method further comprises while an initial payload associated with the webpage hosted by the native mobile application is loading, loading the resources stored in the local web cache into a browser document object model (DOM). In further examples, the computer-implemented method further comprises receiving the initial payload associated with the webpage hosted by the native mobile application from the website. In further examples, the computer-implemented method further comprises sending a request to the website for additional resources for rendering the webpage hosted by the native mobile application, wherein the additional resources include resources not included in the manifest file. In further examples, the computer-implemented method further comprises downloading the additional resources for rendering the webpage hosted by the native mobile application. In further examples, the computer-implemented method further comprises rendering the webpage within the native mobile application in a user interface.

Additional aspects disclosed herein provide exemplary systems comprising one or more computer readable storage media; and program instructions stored on the one or more computer readable storage media that, when executed by at least one processor, cause the at least one processor to at least: in response to receiving a selection of a native mobile application icon, launch a native mobile application associated with the native mobile application icon; send a request to a service for a manifest file, wherein the manifest file includes at least resources for rendering a web page hosted by the native mobile application; download the manifest file from the service; and store the manifest file in a local web cache. In further examples, the service includes at least a content delivery network and a native mobile application service. In further examples, the manifest file is a latest version of the manifest file. In further examples, the resources for rendering the web page hosted by the native mobile application include at least Javascript and Cascading Style Sheets (CSS) frameworks associated with the native mobile application.

Techniques for accelerating loading, parsing and rendering of webpages hosted by a native mobile application are described. Although aspects are described in language specific to structural features and/or methodological acts, it is to be understood that the aspects defined in the appended claims are not necessarily limited to the specific features or acts described above. Rather, the specific features and acts are disclosed as example forms of implementing the claimed aspects.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods may be implemented via interaction between various entities discussed above with reference to the touchable user interface.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Additionally, while the aspects may be described in the general context of native mobile application systems that execute in conjunction with an application program that runs on an operating system on a computing device, those skilled in the art will recognize that aspects may also be implemented in combination with other program modules. In further aspects, the aspects disclosed herein may be implemented in hardware.

Generally, program modules include routines, programs, components, data structures, and other types of structures that perform particular tasks or implement particular abstract data types. Moreover, those skilled in the art will appreciate that aspects may be practiced with other computer system configurations, including hand-held devices, multiprocessor systems, microprocessor-based or programmable consumer electronics, minicomputers, mainframe computers, and comparable computing devices. Aspects may also be practiced in distributed computing environments where tasks are performed by remote processing devices that are linked through a communications network. In a distributed computing environment, program modules may be located in both local and remote memory storage devices.

Aspects may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

What is claimed is:

1. A system comprising:
   at least one processor; and
   memory encoding computer executable instructions that, when executed by the at least one processor, perform a method for accelerating loading, parsing, and rendering of a web page hosted by a native mobile application, the method comprising:
   upon launching the native mobile application, storing a manifest file received from one or more servers associated with the native mobile application in a local web cache, where the manifest file includes at least webpage data and resources for rendering the webpage hosted by the native mobile application at a later time;
   in response to an activation of an icon associated with a website in the native mobile application, sending a request, via the native mobile application, to an application service associated with the website associated with the native mobile application for the webpage;
   while initial content of the webpage is loading, loading the resources stored in the local web cache into a browser document object model (DOM) and pre-compiling the resources for rendering the webpage;
   sending another request to the application service for additional resources for rendering the webpage, wherein the additional resources include resources not included in the manifest file; and
   rendering the webpage within the native mobile application in a user interface.

2. The system of claim 1, wherein the method further comprises downloading the additional resources.

3. The system of claim 2, wherein the method further comprises loading the additional resources into the browser document object model DOM.

4. The system of claim 3, wherein the resources for rendering the web page hosted by the native mobile application include at least Javascript and Cascading Style Sheets (CSS) frameworks associated with the native mobile application.

5. The system of claim 1, wherein the method further comprises while the initial content of the webpage is loading presenting a loading status indicator within the native mobile application.

6. A computer-implemented method for pre-loading webpage data by a native mobile application, the method comprising:
   upon launching the native mobile application, sending a request from the native mobile application to one or more servers associated with the native mobile for a latest version of a manifest file, wherein the manifest file includes at least webpage data and resources for rendering a webpage hosted by the native mobile application at a later time;
   when the service has the latest version of the manifest file, downloading the latest version of the manifest file from the one or more servers associated with the native mobile application;
   storing the latest version of the manifest file in a local web cache;

in response to an activation of an icon associated with a website in the native mobile application, sending a request, via the native mobile application, to an application service associated with the website associated with the native mobile application for the webpage;

while initial content of the webpage is loading, loading the resources stored in the local web cache into a browser document object model (DOM) and pre-compiling the resources for rendering the webpage; and sending another request to the application service for additional resources for rendering the webpage, wherein the additional resources include resources not included in the manifest file.

7. The computer-implemented method of claim 6, wherein the resources for rendering the web page hosted by the native mobile application include at least Javascript and Cascading Style Sheets (CSS) frameworks associated with the native mobile application.

8. The computer-implemented method of claim 6, further comprising receiving the initial payload associated with the webpage hosted by the native mobile application from the website.

9. The computer-implemented method of claim 6, further comprising downloading the additional resources for rendering the webpage hosted by the native mobile application.

10. The computer-implemented method of claim 9, further comprising rendering the webpage within the native mobile application in a user interface.

11. A system comprising:
one or more computer readable storage media; and
program instructions stored on the one or more computer readable storage media that, when executed by at least one processor, cause the at least one processor to at least:
in response to receiving a selection of a native mobile application icon, launch a native mobile application associated with the native mobile application icon;
upon launching the native mobile application, send a request to one or more servers associated with the native mobile application for a manifest file, wherein the manifest file includes at least webpage data and resources for rendering a web page hosted by the native mobile application at a later time;
download the manifest file from the one or more servers associated with the native mobile application; and
store the manifest file in a local web cache
in response to an activation of an icon associated with a website in the native mobile application, send a request, via the native mobile application, to an application service associated with the website associated with the native mobile application for the webpage;

while initial content of the webpage is loading, load the resources stored in the local web cache into a browser document object model (DOM) and pre-compiling the resources for rendering the webpage;

send another request to the application service for additional resources for rendering the webpage, wherein the additional resources include resources not included in the manifest file; and render the webpage within the native mobile application in a user interface.

12. The system of claim 11, wherein the one or more servers associated with the native mobile application includes at least a content delivery network.

13. The system of claim 11, wherein the manifest file is a latest version of the manifest file.

14. The system of claim 11, wherein the resources for rendering the web page hosted by the native mobile application include at least Javascript and Cascading Style Sheets (CSS) frameworks associated with the native mobile application.

15. The computer-implemented method of claim 6 further comprising while the initial content of the webpage is loading, presenting a loading status indicator within the native mobile application.

16. The computer-implemented method of claim 9 further comprising loading the additional resources into the browser document object model DOM.

17. The system of claim 11, wherein the program instructions stored on the one or more computer readable storage media, when executed by at least one processor, further cause the at least one processor to at least download the additional resources for rendering the webpage.

18. The system of claim 17, wherein the program instructions stored on the one or more computer readable storage media, when executed by at least one processor, further cause the at least one processor to at least load the additional resources into the browser document object model DOM.

19. The system of claim 11, wherein the program instructions stored on the one or more computer readable storage media, when executed by at least one processor, further cause the at least one processor to at least while the initial content of the webpage is loading, present a loading status indicator within the native mobile application.

20. The system of claim 1, wherein the one or more servers associated with the native mobile application includes at least a content delivery network.

* * * * *